United States Patent
Moore et al.

(10) Patent No.: US 9,068,764 B2
(45) Date of Patent: Jun. 30, 2015

(54) METHOD AND APPARATUS FOR CLAMPING FRAMELESS THIN-FILM SOLAR MODULE

(71) Applicant: Stion Corporation, San Jose, CA (US)

(72) Inventors: Joshua Alexander Moore, San Jose, CA (US); Todd G. Brehmer, San Jose, CA (US); Robert D. Wieting, Simi Valley, CA (US)

(73) Assignee: Stion Corporation, San Jose, CA (US)

( * ) Notice: Subject to any disclaimer, the term of this patent is extended or adjusted under 35 U.S.C. 154(b) by 205 days.

(21) Appl. No.: 13/911,911

(22) Filed: Jun. 6, 2013

(65) Prior Publication Data

US 2014/0361135 A1    Dec. 11, 2014

(51) Int. Cl.
*H01L 31/042* (2014.01)
*F24J 2/52* (2006.01)
*E04D 3/366* (2006.01)

(52) U.S. Cl.
CPC .......... *F24J 2/5201* (2013.01); *Y10T 29/49952* (2015.01); *E04D 3/366* (2013.01); *F24J 2002/522* (2013.01); *Y02E 10/50* (2013.01); *H02S 20/00* (2013.01)

(58) Field of Classification Search
CPC .. Y10T 29/49952; E04D 3/366; F24J 2/5201; F24J 2/5207; F24J 2/5209; F24J 2/52; F24J 2002/5294; F24J 2002/522; H02S 20/23; Y02B 10/12
USPC ...... 248/316.7, 500, 680; 52/173.3; 136/244, 291, 251
See application file for complete search history.

(56) References Cited

U.S. PATENT DOCUMENTS

| | | | | |
|---|---|---|---|---|
| 3,574,985 A | * | 4/1971 | Pierce | 52/463 |
| 5,155,952 A | * | 10/1992 | Herwegh et al. | 52/100 |
| 5,164,020 A | * | 11/1992 | Wagner et al. | 136/251 |
| 5,409,549 A | * | 4/1995 | Mori | 136/244 |
| 5,655,346 A | * | 8/1997 | Holmes et al. | 52/476 |
| 5,678,383 A | * | 10/1997 | Danielewicz | 52/775 |
| 6,105,317 A | * | 8/2000 | Tomiuchi et al. | 52/173.3 |
| 6,269,596 B1 | * | 8/2001 | Ohtsuka et al. | 52/173.3 |
| 7,307,209 B2 | * | 12/2007 | Mapes et al. | 136/251 |
| 8,572,909 B2 | * | 11/2013 | Rivera et al. | 52/173.3 |
| 2010/0132274 A1 | * | 6/2010 | Reyal et al. | 52/173.3 |
| 2013/0125492 A1 | * | 5/2013 | Molek et al. | 52/489.1 |

* cited by examiner

*Primary Examiner* — Anita M King

(74) *Attorney, Agent, or Firm* — Kilpatrick Townsend & Stockton LLP

(57) ABSTRACT

An apparatus for mounting a frameless solar module includes a top member made by a solid material including two contact pads and a bottom member made by a rubber material including two upward rounded end bumps. The top member and the bottom member are operably fixed by a screw set in a symmetric mounting configuration. The contact pad is also made from the rubber material for pressing onto a top cover glass panel near an edge region. The upward rounded end bump is for supporting a portion of a bottom substrate glass panel at a first offset distance away from the top cover glass panel and a horizontal offset distance away from the edge region. The first offset distance is adjusted to a thickness of the frameless solar module and the second distance is predetermined for providing adequate support of the frameless solar module to allow uninhibited flexion under load.

23 Claims, 6 Drawing Sheets

METHOD AND APPARATUS FOR CLAMPING FRAMELESS THIN-FILM SOLAR MODULE

CROSS-REFERENCES TO RELATED APPLICATIONS

This application is related to U.S. patent application Ser. No. 29/451,948, filed on Apr. 10, 2013, entitled "MOUNTING CLIP ASSEMBLY", commonly assigned and incorporated herein by reference for all purposes.

BACKGROUND OF THE INVENTION

The present invention relates generally to thin-film solar technology. More particularly, the present invention provides a method and apparatus for clamping frameless thin-film solar module. Merely by way of example, the present invention is applied for mounting one or more frameless thin-film solar modules made on large planar glass panels, but it would be recognized that the invention may have many applications.

From the beginning of time, mankind has been challenged to find way of harnessing energy. Energy comes in the forms such as petrochemical, hydroelectric, nuclear, wind, biomass, solar, and more primitive forms such as wood and coal. Over the past century, modern civilization has relied upon petrochemical energy as an important energy source. Petrochemical energy includes gas and oil. Gas includes lighter forms such as butane and propane, commonly used to heat homes and serve as fuel for cooking. Gas also includes gasoline, diesel, and jet fuel, commonly used for transportation purposes. Heavier forms of petrochemicals can also be used to heat homes in some places. Unfortunately, the supply of petrochemical fuel is limited and essentially fixed based upon the amount available on the planet Earth. Additionally, as more people use petroleum products in growing amounts, it is rapidly becoming a scarce resource, which will eventually become depleted over time.

More recently, environmentally clean and renewable sources of energy have been desired. An example of a clean source of energy is hydroelectric power. Hydroelectric power is derived from electric generators driven by the flow of water produced by dams such as the Hoover Dam in Nevada. The electric power generated is used to power a large portion of the city of Los Angeles in California. Clean and renewable sources of energy also include wind, waves, biomass, and the like. That is, windmills convert wind energy into more useful forms of energy such as electricity. Still other types of clean energy include solar energy. Specific details of solar energy can be found throughout the present background and more particularly below.

Solar energy technology generally converts electromagnetic radiation from the sun to other useful forms of energy. These other forms of energy include thermal energy and electrical power. For electrical power applications, solar cells are often used. Although solar energy is environmentally clean and has been successful to a point, many limitations remain to be resolved before it becomes widely used throughout the world. As an example, one type of solar cell uses crystalline materials, which are derived from semiconductor material ingots. These crystalline materials can be used to fabricate optoelectronic devices that include photovoltaic and photodiode devices that convert electromagnetic radiation into electrical power. However, crystalline materials are often costly and difficult to make on a large scale. Additionally, devices made from such crystalline materials often have low energy conversion efficiencies. Other types of solar cells use "thin film" technology to form a thin film of photosensitive material to be used to convert electromagnetic radiation into electrical power. Similar limitations exist with the use of thin film technology in making solar cells. In some state-of-art thin-film solar modules, glass panel with a size as large as 5 foot×2 foot or greater is used as substrate for forming the thin-film solar cells and a comparable size cover glass is attached, resulting in large cost reduction compared to assembling many Si-based solar cells made on much smaller sized silicon wafers. Upon the achievement of proper edge sealing technology, the thin-film solar module formed on those large size glass panels can be made as a frameless configuration for further reduction in manufacture and installation cost. However, no existing mounting clip device is properly designed for directly clamping the glass surface especially with consideration of providing enough support while minimizing any strain force that may result in the breakage of glass substrate. From the above, it is seen that improved method and apparatus for clamping frameless glass panels for mounting thin-film solar modules are desired.

BRIEF SUMMARY OF THE INVENTION

The present invention relates generally to thin-film solar technology. More particularly, the present invention provides a method and apparatus for clamping frameless thin-film solar module. Merely by way of example, the present invention is applied for mounting one or more frameless thin-film solar modules made on large planar glass panels, but it would be recognized that the invention may have many applications.

In a specific embodiment, the present invention provides an apparatus for mounting frameless solar modules. The apparatus includes a top member made by a single piece of solid material of a first length including a flat base portion with a first central hole and two wing-span portions out-extending from two opposite sides of the flat base portion respectively with two tilted arms connected to two contact sections. The single piece of solid material has a uniform cross-sectional shape throughout the first length such that the two contact sections are positioned from each other by a first width and in a same height above the flat base portion. Additionally, the apparatus includes a bottom member made by a single piece of rubber material of a second length including a shaped middle section with a second central hole and two planar sections respectively out-extending with a common planar bottom from two opposite sides of the shaped middle section and ending with two partially rounded bumps. The shaped middle section is configured to seamlessly match a shape with the flat base portion and part of the tilted arms of the top member. The single piece of rubber material has a uniform cross-sectional shape throughout a second width. In an embodiment, the top member is operably disposed on the bottom member with the first length perpendicular to the second length in a mounting configuration configured to form a fixed horizontal offset distance and an adjustable vertical offset distance between each upward rounded bump of the bottom member and nearest contact section of the top member for clamping a frameless solar module.

In an alternative embodiment, the present invention provides a method for clamping frameless solar modules laminated with planar glass panels. The method includes providing a plurality of frameless solar modules. Each frameless solar module is laminated with a planar substrate glass panel of a rectangle form factor bonded with a planar cover glass panel having the same form factor to hold a plurality of thin-film solar cells in between. Additionally, the method includes laying out a pair of mounting rail structures and providing a plurality of mounting clip assemblies. Each mounting clip assembly includes a top member made by a single piece of solid material of a first length including a flat base portion with a first central hole and two wing-span portions out-extending from two opposite sides of the flat base portion respectively with two tilted arms connected to two contact sections. The single piece of solid material has a uniform cross-sectional shape throughout the first length such that the two contact sections are positioned from each other by a first width and in a same height above the flat base portion. The mounting clip assembly further includes a bottom member made by a single piece of rubber material of a second length including a shaped middle section with a second central hole and two planar sections respectively out-extending with a common planar bottom from two opposite sides of the shaped middle section and ending with two upward rounded bumps. The shaped middle section is configured to seamlessly match a shape with the flat base portion and part of the tilted arms of the top member. The single piece of rubber material has a uniform cross-sectional shape throughout a second width. Furthermore, the mounting clip assembly may include a screw set including a hex cap bolt and a shaped nut, or any other mechanism or device for coupling the top and bottom members. The method further includes placing the common planar bottom of one bottom member along the second length on a predetermined location on each of the pair of mounting rail structures. Furthermore, the method includes disposing a first frameless solar module belonging to the plurality of frameless solar modules such that two first positions of the planar substrate glass panel off a first longitudinal edge of the first frameless solar module are supported by the two upward rounded bumps of first two bottom members respectively on the pair of mounting rail structures and two other first positions of the planar substrate glass panel off a second longitudinal edge of the first frameless solar module opposite to the first longitudinal edge are supported by two other upward rounded bumps of second two bottom members respectively on the pair of mounting rail structures. The method further includes placing one top member on top of each said bottom member with the corresponding first central hole being aligned with the corresponding second central hole to allow the flat base portion and part of tilted arms of the top member to fit in the shaped middle section of the bottom member. Moreover, the method includes inserting the hex cap bolt through both the first central hole and the second central hole for fastening with the shaped nut separately disposed below the mounting rail structure such that two second positions of the planar cover glass panel next to the first longitudinal edge are contacted by two contact sections of first two top members associated with the first two bottom members and two other second positions of the planar cover glass panel next to the second longitudinal edge are contacted by two other contact sections of second two top members associated with the second two bottom members. In an embodiment, each first position is vertically offset from the corresponding second position by a first distance based on a thickness from the planar cover glass panel to the planar substrate glass panel and horizontally offset from the same second position by a second distance predetermined for adequately supporting the first frameless solar module.

Many benefits can be achieved by applying the embodiments of the present invention. Particularly, a simple design in terms of assembly structure and material selection for the assembling members provides cost saving advantages in mounting material usage and installation of a series of frameless solar modules. The two independent pieces of assembly members simplifies manufacture process and adapts with the strength difference between a cover glass and a substrate glass used for the laminated frameless solar module. A strong solid material is used for making a top member of the mounting clip assembly for pressing the stronger cover glass and a rubber material with proper hardness is selected to make a bottom member of the mounting clip assembly for providing recessed support adequate for the non-tempered substrate glass. Additionally, offset distance between the clamping position on the cover glass and the supporting position below the substrate glass is optimized based on the custom form factor of the frameless solar module as well as considerations of extra static load potentially applied onto the module.

These and other benefits may be described throughout the present specification and more particularly below.

DETAILED DESCRIPTION OF THE INVENTION

The present invention relates generally to thin-film solar technology. More particularly, the present invention provides a method and apparatus for clamping frameless thin-film solar module. Merely by way of example, the present invention is applied for mounting one or more frameless thin-film solar modules made on large planar glass panels, but it would be recognized that the invention may have many applications.

Figure 1:
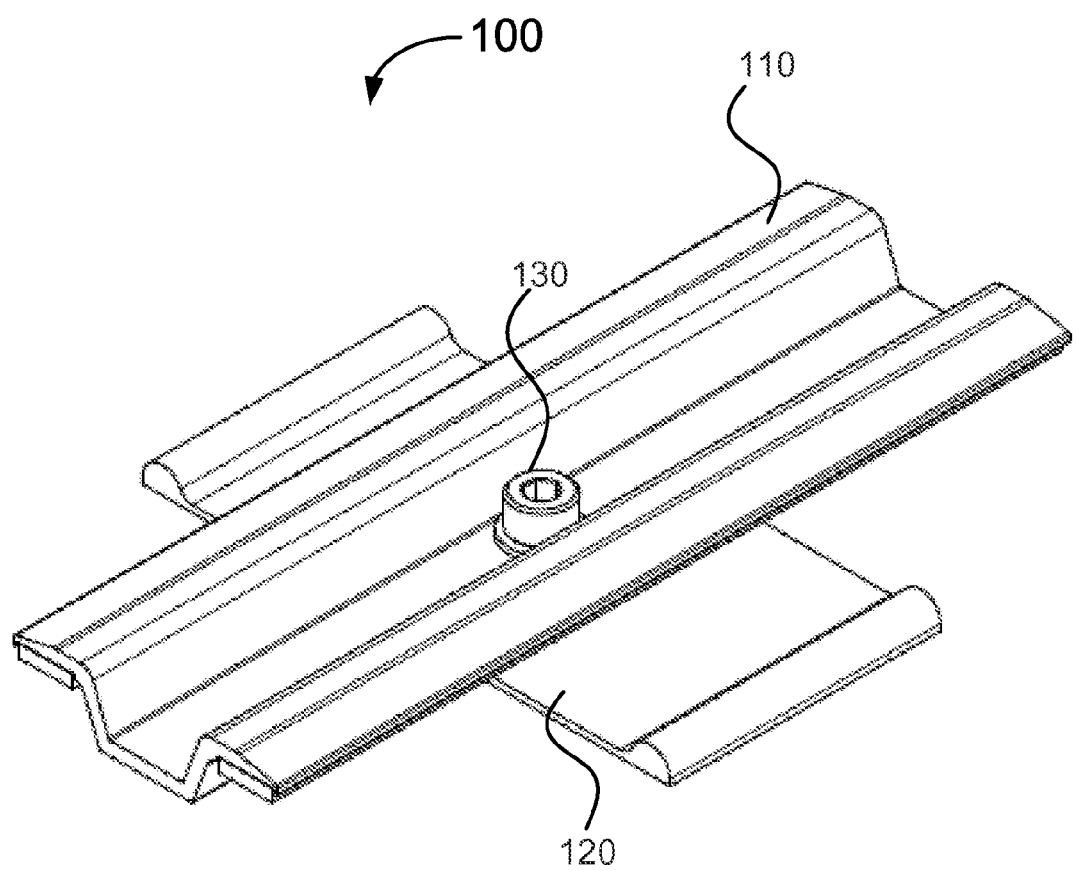
FIG. 1 is a perspective view of an apparatus for mounting frameless solar module according to an embodiment of the present invention.

FIG. 1 is a perspective view of an apparatus for mounting frameless solar module according to an embodiment of the present invention. This diagram is merely an example, which should not unduly limit the scope of the claims herein. As shown, the apparatus is a mounting clip 100 assembled by a top member 110 on a bottom member 120 by a screw 130, although it should be understood that other coupling devices including bolts, fasteners, or any other device configured to couple the members as described may be used in disclosed embodiments. The top member 110 is made from a single piece of solid material including a central hole (for insertion through by the screw 130). For example, the solid material is selected from aluminum, hard plastic, or others, for its low cost, easy to machining, good mechanical strength required for clamping module made from large and relative heavy planar glass panels. The bottom member 120 is made from a single piece of rubber material including a central hole (also for insertion through by the screw 130). The bottom member 120 is designated for providing a support directly to a substrate glass panel from below. Since the substrate glass panel is usually not tempered glass and has relatively less strength, in order to avoid causing any stress-related damage or breakage by any sharp or hard mechanical feature while still hard enough to provide adequate support, the bottom member 120 is chosen to use a rubber material with hardness measure of Durometer 50. A single screw 130 including a hex cap bolt is used for assembling the top member 110 and the bottom member 120 into a mounting configuration, although additional screws may be added as well as utilizing additional or alternative coupling devices as would be understood. More details about the structural and functional features of both the top member 110 and the bottom member 120 will be found throughout the specification and particularly below.

Figure 2A:
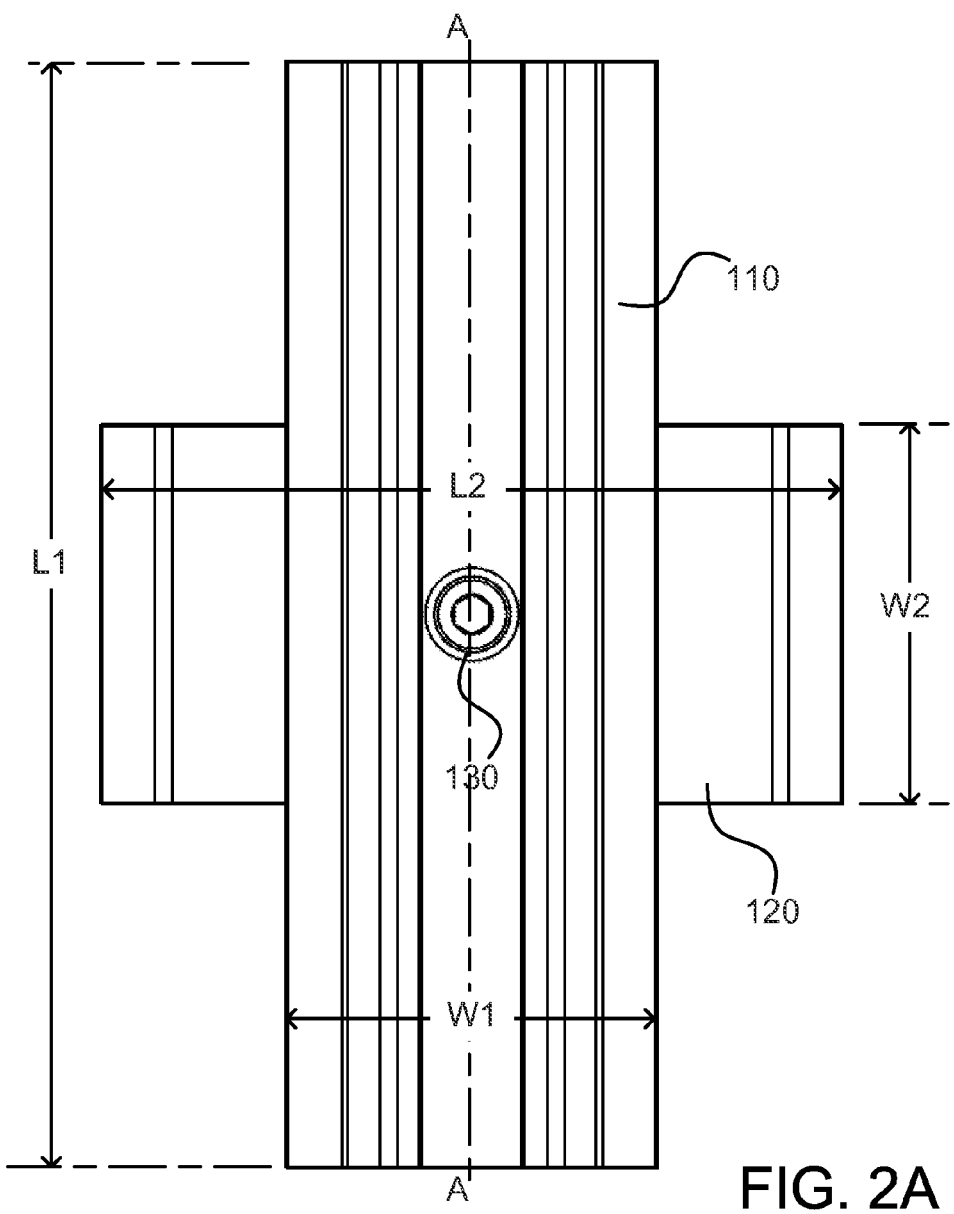
FIG. 2A is a top view of the apparatus of FIG. 1 according to an embodiment of the present invention.

FIG. 2A is a top view of the apparatus of FIG. 1 according to an embodiment of the present invention. This diagram is merely an example, which should not unduly limit the scope of the claims herein. This diagram shows, in an embodiment, both the top member 110 and the bottom member 120 of the mounting clip assembly 100 are configured to be reflection symmetric relative to a middle line AA along the length direction of the top member. The length of the top member 110 is denoted as L1. The width of the top member is denoted as W1. The width of the bottom member is denoted as W2, being aligned also in the length direction of the top member. The length of the bottom member is denoted as L2. The bottom member 120 can be viewed with an overall orientation perpendicular to the top member 110 to form a cross-like configuration. As seen, L1 is greater than W2 and L2 is greater than W1.

Figure 2B:
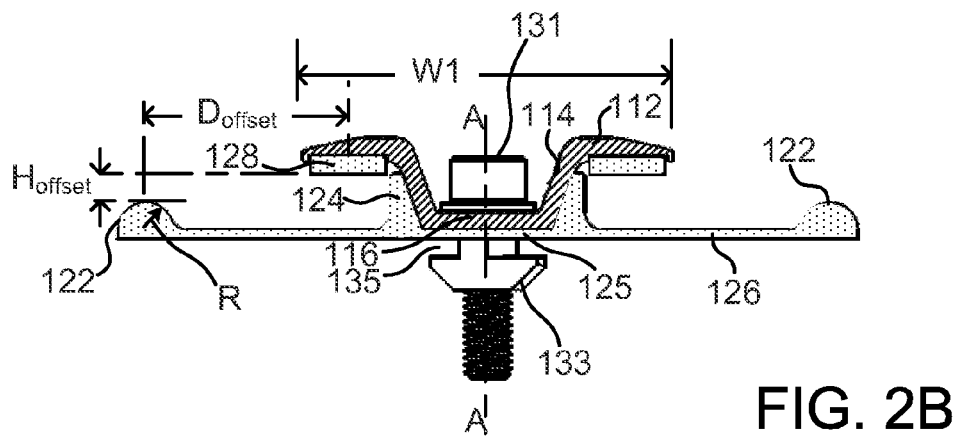
FIG. 2B is a side view of the apparatus of FIG. 1 according to an embodiment of the present invention.

The reflection symmetry of both the top member and bottom member can be seen directly in FIG. 2B, which is a side view of the same mounting clip assembly 100 of FIG. 2A. As shown, the top member 110 is made of a single piece of solid material having a uniform cross-sectional shape throughout its length L1. In this side view, the top member 110 is divided into a flat base portion 116 and two wing-span portions symmetrically out-extending from two sides of the flat base portion 116. Each wing-span portion has a tilted arm 114 connected upward to a contact section 112 such that the contact section 112 is positioned a height above the flat base portion 116. The contact section 112 is designated to form a contact with a top surface of a planar device such as a frameless solar module from above. In particular, a contact pad 128 is attached to an underside of the contact section 112 for making the physical contact when the top member 110 is placed in the mounting configuration as shown in FIG. 1.

Referring to the FIG. 2B, the bottom member 120 has common planar bottom throughout its length L2 and a uniform shape throughout its width W2. In the side view showing the shape along the length direction, a shaped middle section includes two upward portions 124 located symmetrically on two sides of a flat middle region 125. In a specific embodiment, the shaped middle section is configured to have a flat middle region 125 matching with the flat middle portion 116 and two upward portions 124 with the shaped ledge matching with two symmetrically tilted arms 114 at least partially. The design with seamless matching structure of the shaped middle section of the bottom member effectively restrains the position of the top member 110. Therefore, to dispose the top member 110 on top of the bottom member 120, it is automatically set the mounting configuration when for the central hole of the top member 110 is aligned with the central hole of the bottom member 120. This makes the assembly of the mounting clip much simpler and accurate in positioning the apparatus for mounting the desired object in field. The mounting configuration is operably fixed using a hex cap bolt 131 inserted through both central holes to fasten with a shaped nut 133. The shaped nut 133 is positioned below a fixture (for supporting the mounting clip 110) which is not shown here but supposed to be placed in a gap region 135 between the bottom member 120 and the shaped nut 133.

Further, the bottom member 120 along the length direction includes a pair of planar sections 126 are symmetrically out-extending from the shaped middle section and respectively ending with two upward rounded bumps 122. The upward rounded bump 122 is substantially a semi-cylindrical shape with a radius R as denoted in FIG. 2B. The radius R is small so that the upper tip of the upward rounded bump 122 is still located at a vertical offset distance $H_{offset}$ below the contact pad 128 attached to the underside of the contact section 122. Additionally, As L2 is greater than W1, a center position of the upward rounded bump 122 is located at a horizontal offset distance $D_{offset}$ away from a center position of the contact pad 128. These offset distances are provided for adequate clamping and supporting an edge region of a large, heavy, but brittle object under extra load without causing breakage. Specific values of the offset distance may be determined by the mechanical strength of the material supported by the bottom member 120, the strength difference between the material in contact with the top member 110 and the material supported by the bottom member 120, as well as the weight of the above materials including extra load applied upon.

Figure 3:
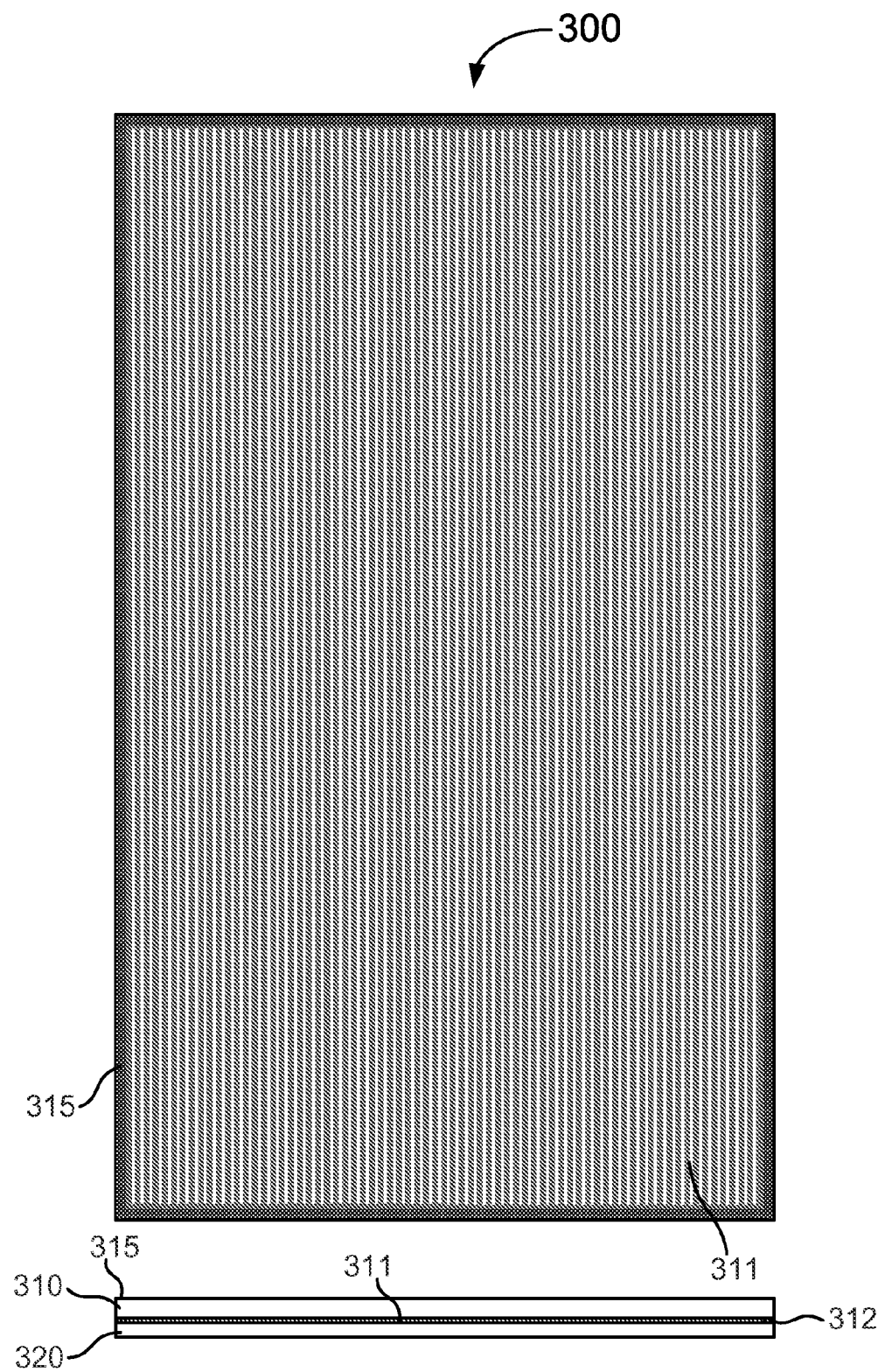
FIG. 3 is a top view and side view of a schematic frameless solar module having a cover glass panel bonded with a substrate glass panel with a plurality of thin-film solar cells are sandwiched in between according to an embodiment of the present invention.

In a specific embodiment, the mounting clip assembly 100 provided in the present invention is directly applicable to mount a frameless solar module having a planar form. For example, the frameless solar module is manufactured by Stion Corporation of California. The solar module is made with a tempered cover glass over CIGS-based thin-film solar cells formed on a non-tempered soda lime glass substrate. Both the cover glass and the substrate glass have a planar rectangular shape in a form factor of 1656 mm×656 mm and a total weight of about 16 kg. FIG. 3 shows a top view and side view of a schematic frameless solar module 300 having a cover glass panel 310 bonded with a substrate glass panel 320 with CIGS-based thin-film solar cells 311 being sandwiched in between according to an embodiment of the present invention. As shown, the CIGS-based thin-film solar cells 311 are a plurality of strip-shaped cells formed on a soda lime substrate glass panel 320, covering most area of the substrate glass panel 320 except a peripheral edge portion 312. On top of the plurality of solar cells 311 a transparent bonding material (not explicitly shown) made from an EVA material is applied. Around the peripheral edge portion 312 a sealing and bonding material is also applied before a cover glass panel 310 is disposed. Both the cover glass panel 310 and the substrate glass panel 320 are planar rectangles with a same form factor. But the tempered cover glass panel has at least ten times of mechanical strength than non-tempered soda lime substrate glass panel.

The solar module 300 is provided without any frame structure for cost saving while a peripheral top edge region 315 of the cover glass panel is provided with an area for mounting. Any clamping device should be designed to use those peripheral top edge region 315 at least partially without causing direct coverage or any shade that blocks sun light reaching to area (or active region) of the stripe-shaped solar cells 311. Since the bottom side of the substrate glass panel 320 is not subjected to any sun light, the corresponding clamping position does not have similar restriction to the clamping device. However, due to the strength difference between the tempered cover glass and the non-tempered substrate glass, an optimum position would be chosen for adequate supporting the glass panel based on other factors like its mechanical strength, and potential extra load (due to snow weight applied on the cover glass panel and wind force applied either on the cover glass panel from above or to the substrate glass panel from below).

Figure 4:
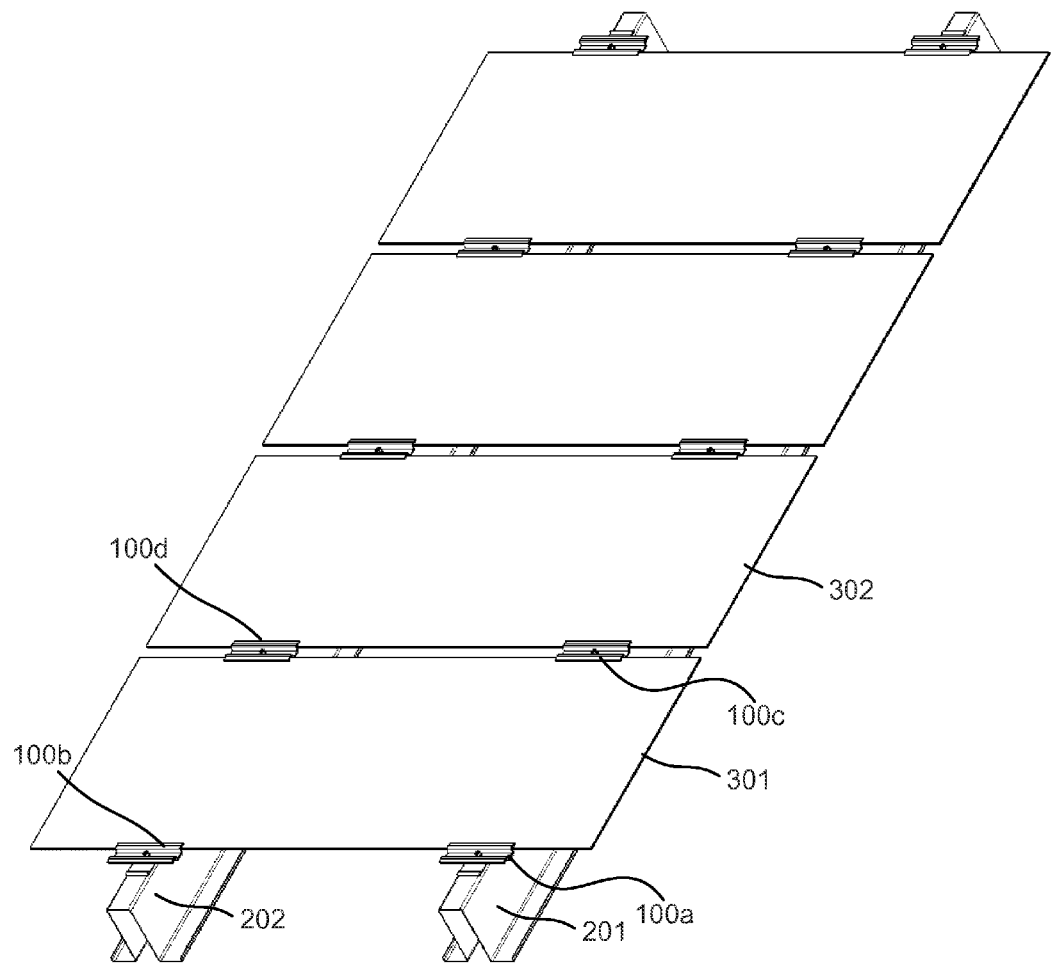
FIG. 4 is a perspective view of a plurality of frameless solar modules being mounted in a series on a pair of mounting rail structures supporting a plurality of mounting clip assemblies for clamping two opposite longitudinal edges of each frameless solar module according to a specific embodiment of the present invention.

FIG. 4 is a perspective view of a plurality of frameless solar modules being mounted in a series on a pair of mounting rail structures supporting a plurality of mounting clip assemblies for clamping two opposite longitudinal edges of each frameless solar module according to a specific embodiment of the present invention. This diagram is merely an example, which should not unduly limit the scope of the claims herein. In a specific embodiment, FIG. 4 shows a method of mounting a series of frameless solar modules 301, 302, . . . , using the clamping device 100 provided in the present invention. As shown, two mounting rail structures 201 and 202 are laid out (for example, on a roof structure of a building or on a rack structure disposed in the field) substantially in parallel with a separation of about 882 mm to 902 mm and sufficient length for mounting the series of frameless solar modules having a form factor of 1656 mm×656 mm. The mounting rail structure 201 or 202 has a top flat ridge for supporting the clamping device which is the mounting clip assembly 100 shown in FIG. 1 and detailed in FIG. 2A and FIG. 2B. The mounting method includes placing two bottom members of two mounting clip assemblies 100a and 100b respectively on the top flat ridges of the two mounting rail structures 201 and 202 so that one longitudinal edge of a first frameless solar module 301 can be clamped by the two mounting clip assemblies with its substrate glass panel (not directly visible in FIG. 4) being supported at two first positions by the two bottom members of the two mounting clip assemblies 100a and 100b while its cover glass panel being clamped at two second positions by two corresponding top members of the two mounting clip assemblies 100a and 100b.

Referring to FIG. 4, the opposite longitudinal edge of the frameless solar module 301 is similarly clamped by two other mounting clip assemblies 100c and 100d placed on the same pair of mounting rail structures 201 and 202. In other words, for mounting the first frameless solar module 301 made from two glass panels bearing a rectangular form factor, four individual mounting clip assemblies are used in association with a pair of mounting rail structures. In the embodiment, it is preferred to allow the longitudinal edge of the rectangular glass panel, not the transverse edge, being clamped by the clamping device so that the spacing between two mounting clip assemblies along the mounting rail structure is associated with a shorter (or width) dimension of the glass panel. In another embodiment, it is preferred to use two mounting clip assemblies 100a and 100b (or 100c and 100d) having an optimum length L1 in the longitudinal direction (across the separation of the pair of mounting rail structures) to clamp the glass panel rather than using a single piece of clamping device with a longer length from one mounting rail structure to another. The advantages of these designs lie in adaptation of the supporting contact force with the glass strength difference between the tempered cover glass and non-tempered substrate glass so as to less likely cause glass panel cracking and a major saving in material cost. In an embodiment, the mounting clip assembly 100 is a clamping device specifically designed for mounting the frameless solar module 300. In particular, the top member 110 is designed with a preferable length L1=190 mm and an optimum width W1 to provide a symmetric wing-span portion including two contact sections.

The contact pad attached to the underside of each contact section has a substantially equal length of about 190 mm and a width of about 13 mm to avoid sun light blocking when it is pressed against the edge portion of the cover glass panel. The corresponding bottom member has a preferred width W2=65 mm and an optimum length L2 to provide two extended sections respectively ending with two upward rounded bumps with a radius of about 13 mm. The optimum length associated with the extended section leads to an optimum horizontal offset distance from the center of the contact pad to the center of the upward rounded bump so that the support by the upward rounded bump to the substrate glass from below is optimized (depending at least on the weight of the frameless solar module, the strength difference between the cover glass and substrate glass, and the extra static load due to wind force or snow accumulation. In a specific embodiment, the preferred horizontal offset distance is about 35 mm. More detail description about the clamping position offset resulted from the spatial configuration of the top and bottom members of the mounting clip assembly will be provided below.

As seen in FIG. 2A and FIG. 2B, the mounting clip assembly 100 is provided with a mirror symmetric structure with respect to a middle line AA designated for mounting the frameless solar modules symmetrically disposed at two sides of the middle line AA. Thus, referring to FIG. 4, the two mounting clip assemblies 100c and 100d used for mounting the first frameless solar module 301 are also available for mounting one longitudinal edge of a second frameless solar module 302, provided that another longitudinal edge of the second frameless solar module 302 is further clamped by two additional mounting clip assemblies disposed on the same mounting rail structures. This mounting method allows a series of frameless solar modules with same standard form factor being repeatedly mounted by adding a new pair of mounting clip assemblies shown in FIG. 1 and FIGS. 2A and 2B. Any pair of mounting clip assemblies 100c and 100d are configured to participate the clamping of two frameless solar modules disposed on their two sides except the pair of mounting clip assemblies 100a and 100b (although with the same symmetric structure) located at the beginning or ending of the series along the mounting rail structures actually participate the clamping of only one frameless solar module.

As shown in FIG. 4, below the top flat ridge of each mounting rail structure there is a hollow space that allows a shaped nut to be disposed from below. Although not explicitly shown, the flat ridge of the mounting rail structure can be drilled a hole at selective locations that are designed for placing the clamping device. Therefore, the bottom member 120 of one mounting clip assembly 100 as shown in FIG. 1 can be placed in one of those selective locations to align the center hole of the bottom member to the hole at that location. In particular, the length of the bottom member is aligned with the length direction of the mounting rail structure. Further, the corresponding top member 110 of the mounting clip assembly 100 can be placed in corresponding mounting configuration, with its length perpendicular to the length of the bottom member, to align the center hole of the top member to the center hole of the bottom member. The hex cap bolt 130 can be inserted through the aligned holes for fastening with the shaped nut in the hollow space of the mounting rail structure as mentioned earlier to complete the mounting configuration of the clamping device in a specific embodiment of the present invention.

Figure 5:
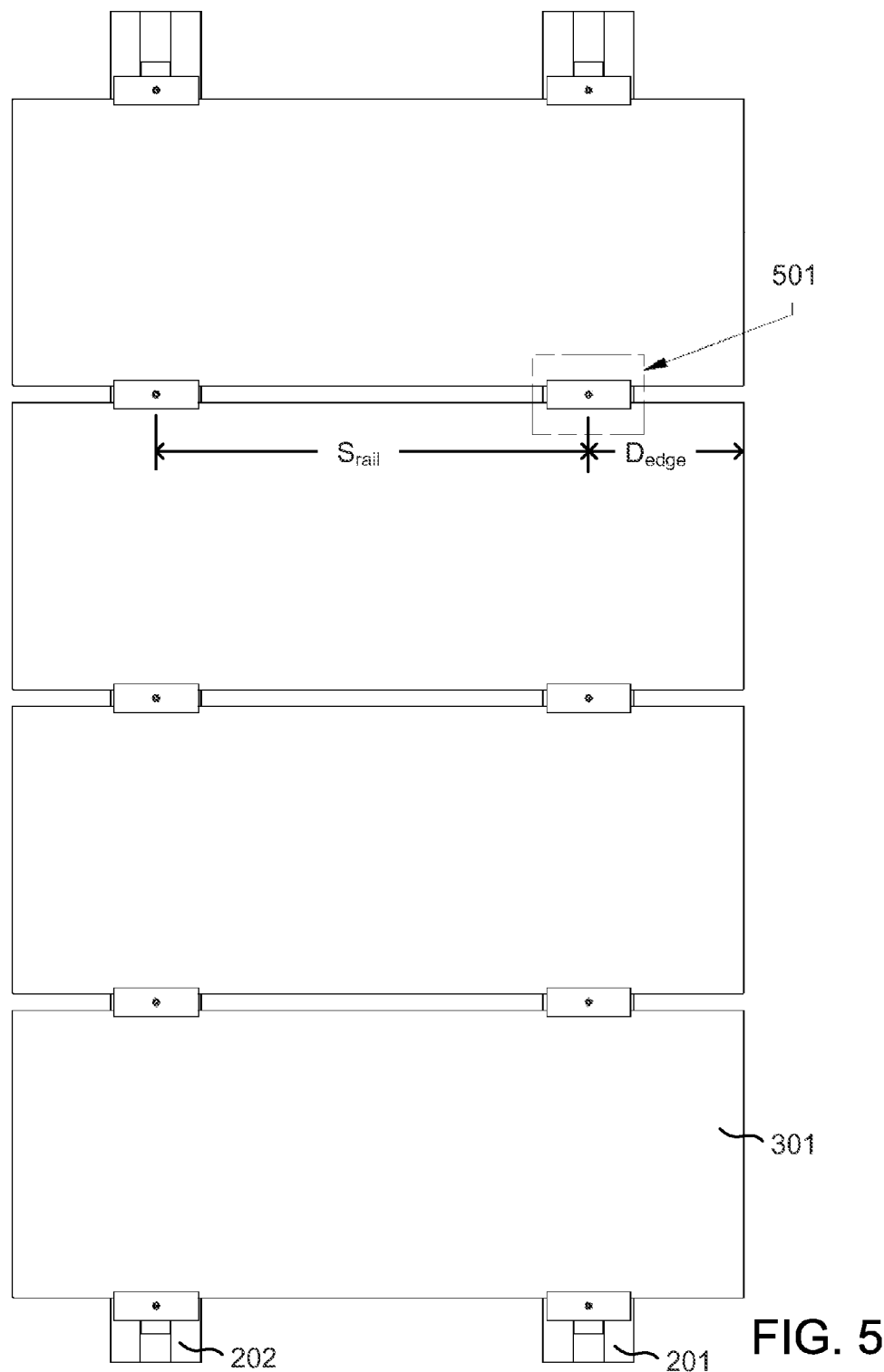
FIG. 5 is a top view of FIG. 4 according to an embodiment of the present invention.

FIG. 5 is a top view of FIG. 4 according to an embodiment of the present invention. This diagram is merely an example, which should not unduly limit the scope of the claims herein. As shown, two mounting rail structures 201 and 202 are laid in parallel with a center-to-center separation denoted by $S_{rail}$.

A column (in this view) of frameless solar modules 301 are mounted using at least four clamping devices for each module. Two of the four clamping devices are placed on the top flat ridge of one of the two mounting rail structures. Provided that the frameless solar module has a form factor of 1656 mm×656 mm and the clamping devices are designated for clamping its longitudinal edges of each frameless solar module, the separation $S_{rail}$ between two rail structures also determines an offset distance $D_{edge}$ between a center of the clamping device and the nearest transverse edge of each frameless solar module, as marked for a specific clamping device region 501. In a preferred embodiment, the $S_{rail}$ has an optimum range from 882 mm to 902 mm and correspondingly $D_{edge}$ has an optimum range from 387 mm to 377 mm for being best suit for supporting the frameless solar module of said form factor under certain designed static load from possible wind force and weight of accumulated snow. Of course, the designed offset or mounting rail separation can be adjusted if the form factor, weight, and designed static load are changed or modified. Detailed structure around the marked clamping device region 501 and associated sections of the clamped frameless solar modules are further illustrated in FIG. 5A and FIG. 5B and are described in more details below.

Figure 5A:
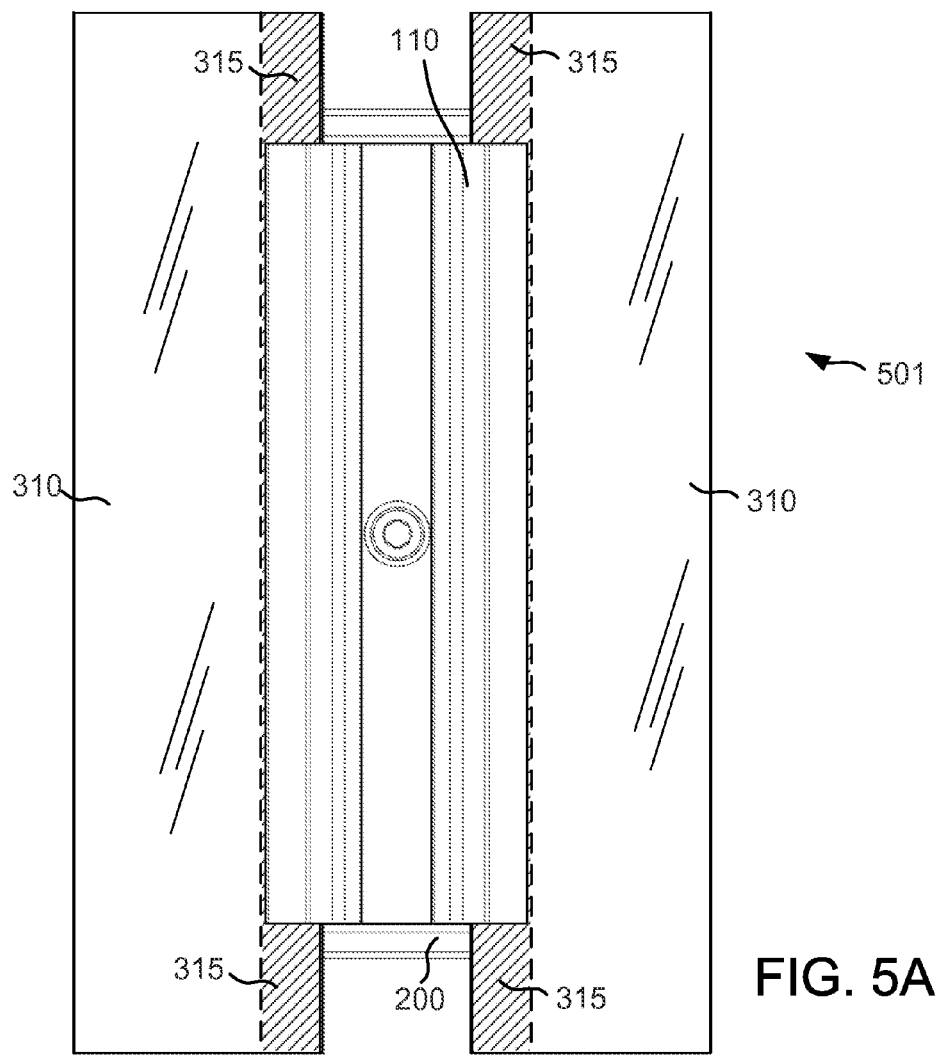
FIG. 5A is a top view of a local region in FIG. 5 around a mounting clip assembly between two edge regions of two frameless solar modules according to an embodiment of the present invention.

FIG. 5A is a top view of a local region in FIG. 5 around a mounting clip assembly between two edge regions of two frameless solar modules according to an embodiment of the present invention. This diagram is merely an example, which should not unduly limit the scope of the claims herein. As shown, the top member 110 of the mounting clip assembly (100 of FIG. 1) includes two contact sections respectively pressing partially on two edge portions 315 of two cover glass panels 310 to clamp the two frameless solar modules symmetrically at each side of the mounting clip assembly. These edge portions 315 are excluded from an active region associated with a plurality of thin-film solar cells associated with the frameless solar module for converting sun light into electrical energy. Therefore, the top member 110 of the mounting clip assembly of the present invention would not cause any shading or direct blocking sun light to reach all active region of the solar module.

Figure 5B:
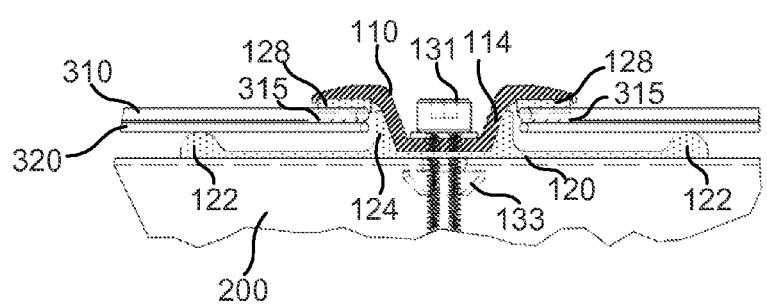
FIG. 5B is a side view of FIG. 5A according to an embodiment of the present invention.

FIG. 5B is a side view of FIG. 5A according to an embodiment of the present invention. This diagram is merely an example, which should not unduly limit the scope of the claims herein. As shown, two frameless solar modules are clamped from respectively opposed edge regions by the mounting clip assembly in the middle in a designated mounting configuration. The mounting configuration is associated with two upward rounded bumps 122 of the bottom member 120 supporting the top member 110 from below at two first positions that are an offset distance inside respectively from the edges of the two substrate glass panels 320. The mounting configuration at the same time is associated with the top member 110 pressing two contact pads 128 respectively on two second positions next to edges of the cover glass panels 310. The second position is horizontally off from the first position by a preferred offset distance of about 35 mm measured from the center of the contact pad 128 to the center of corresponding upward rounded bump 122, which is optimized within the present embodiment of the mounting clip assembly for clamping the custom frameless solar module having form factor of 1656 mm×656 mm currently provided by Stion Corp. If the offset is much shorter than 35 mm, the mounting clip would not provide adequate support for the frameless solar module having the above custom form factor with potential extra static load under consideration. Both the contact pads 128 and the upward rounded bumps 122 are made from a relative soft rubber material to allow certain degrees of recession when pressing or supporting the corresponding glass panels so that no sharp protrusion or hard material to cause potential damage or stressed cracking to the brittle glass material. The top member 110 and the bottom member 120 are configured to match in shapes including two raised regions 124 in the bottom member seamlessly supporting the tilted arms 114 of the top member to restrict their relative orientation and placement (see FIG. 2B). The mounting configuration is further associated with an alignment of both center holes of the top member 110 and bottom member 120 with an hole on the mounting rail structure 200 to allow insertion through by a bolt 131 from above the top member 110 to fasten with a shaped nut 133 disposed at a hollow space below the mounting rail structure 200 which directly supports the common flat bottom of the bottom member 120.

Referring to FIG. 5B, as the mounting clip assembly clamps one frameless solar module from either side, the edges of both cover glass panel 310 and substrate glass panel 320 are substantially near the tilted arms 114 of the top member 110. As seen, the two raised regions 124 not only provide a supporting ledge seamlessly matching the tilted arms 114 but also provide a softened buffer (as the bottom member is made by a rubber material) for preventing the edges of glasses from being directly hit by solid material near the tilted arms 114 of the top member 110.

In a specific embodiment, the present invention provides an apparatus for mounting a frameless solar module laminated with a tempered cover glass and a non-tempered substrate glass having a rectangle form factor of 1656 mm×656 mm. The apparatus is an assembled from a top member and a bottom member by a screw set, as shown as FIG. 1, for mounting the frameless thin-film solar module onto a mounting structure. The top member is made by a single piece of solid material of a first length including a flat base portion with a first central hole and two wing-span portions out-extending from two opposite sides of the flat base portion respectively with two tilted arms connected to two contact sections. The top member is substantially the one depicted in FIG. 1, FIG. 2A, and FIG. 2B as the piece of solid material 110. The single piece of solid material has a uniform cross-sectional shape throughout the first length such that the two contact sections are positioned from each other by a first width and in a same height above the flat base portion. In an embodiment, the solid material is aluminum or hard plastic though other materials may be applicable. In another embodiment, the top member includes an extra contact pad attached at underside of each of the two contact sections for clamping edge portion of the cover glass of the frameless solar module.

The bottom member is made by a single piece of rubber material of a second length including a shaped middle section with a second central hole and two planar sections respectively out-extending with a common planar bottom from two opposite sides of the shaped middle section and ending with two partially rounded bumps. The shaped middle section is configured to seamlessly match a shape with the flat base portion and part of the tilted arms of the top member. The single piece of rubber material has a uniform cross-sectional shape throughout a second width. The bottom member is substantially the one depicted in FIG. 1, FIG. 2A, and FIG. 2B as the piece of rubber material 120.

The screw set includes a hex cap bolt and a shaped nut, as depicted in FIG. 1 and FIG. 2B for holding the top member 110 and the bottom member 120 in a designated mounting configuration. The mounting configuration is associated with the top member being operably disposed on the bottom member with the first length perpendicular to the second length such that the hex cap bolt 131 is inserted through both the first central hole and the second central hole for fastening with the shaped nut 133. The mounting configuration formed above automatically provides a fixed horizontal offset distance and an adjustable vertical offset distance (see FIG. 2A and FIG. 2B) between each upward rounded bump of the bottom member and nearest contact section of the top member for clamping the frameless solar module, as seen in FIGS. 5A and 5B.

Although the above has been illustrated according to specific embodiments, there can be other modifications, alternatives, and variations. It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for mounting frameless solar modules, the apparatus comprising:
   a top member including a single piece of solid material of a first length having a flat base portion with a first central hole and two wing-span portions out-extending from two opposite sides of the flat base portion respectively with two tilted arms connected to two contact sections, the single piece of solid material having a uniform cross-sectional shape throughout the first length such that the two contact sections are positioned from each other by a first width and in a same height above the flat base portion; and
   a bottom member including a single piece of rubber material of a second length having a shaped middle section with a second central hole and two planar sections respectively out-extending with a common planar bottom from two opposite sides of the shaped middle section and ending with two partially rounded bumps, the shaped middle section being configured to seamlessly match a shape with the flat base portion and part of the tilted arms of the top member, the single piece of rubber material having a uniform cross-sectional shape throughout a second width;
   wherein the top member is operably disposed on the bottom member with the first length perpendicular to the second length in a mounting configuration configured to provide a fixed horizontal offset distance and an adjustable vertical offset distance between each upward rounded bump of the bottom member and nearest contact section of the top member for clamping a frameless solar module.

2. The apparatus of claim 1 wherein the solid material of the top member comprises aluminum.

3. The apparatus of claim 1 wherein the rubber material of the bottom member is selected to have a hardness measured by Durometer 50.

4. The apparatus of claim 1 wherein the two wing-span portions are symmetric relative to a middle line of the flat base portion along the first length direction.

5. The apparatus of claim 1 wherein the shaped middle section and the two planar sections respectively out-extending with a common planar bottom from two opposite sides of the shaped middle section and ending with two partially rounded bumps are symmetric relative to a middle line of the shaped middle section along the second width direction.

6. The apparatus of claim 1 further comprising a contact pad fixedly attached to an underside of each contact section throughout the first length of the top member.

7. The apparatus of claim 6 wherein the contact pad is made by a rubber material having a hardness measured by Durometer 50.

8. The apparatus of claim 6 wherein the contact pad is configured to be pressed on a planar cover glass of the frameless solar module having a form factor of 1656 mm×656 mm at a first location near a longitudinal edge while the upward rounded bump supporting a planar substrate glass of the frameless solar module having the same form factor of 1656 mm×656 mm from below at a second location away from the corresponding longitudinal edge by the fixed horizontal offset distance.

9. The apparatus of claim 8 wherein the fixed horizontal offset distance is about 35 mm measured from a center of the upward rounded bump to a center of the contact pad in a direction parallel to the common planar bottom of the bottom member.

10. The apparatus of claim 8 wherein the contact pad has a width no greater than 13 mm substantially free from causing any shade to an active area of the frameless solar module when the contact pad is in contact with the planar cover glass.

11. The apparatus of claim 8 wherein the contact pad has a length equal to the first length of the top member ranging from 180 mm to 200 mm for providing adequate clamping of the frameless solar module under static load.

12. The apparatus of claim 8 wherein the upward rounded bump has an apparent hemi-cylindrical shape with a radius of about 13 mm and a length equal to the second length ranging from 45 mm to 65 mm for providing adequate recessed support to the substrate glass that allows for uninhibited flexion of the frameless solar module under static load.

13. The apparatus of claim 8 wherein the adjustable vertical offset distance comprises a minimum value equal to the thickness of the frameless solar module measured from top surface of the planar cover glass to bottom surface of the planar substrate glass when the contact pad is pressed on the top surface of the planar cover glass from above while the upward rounded bump supports the bottom surface of the planar substrate glass from below.

14. The apparatus of claim 1 wherein the shaped middle section of the bottom member comprises a flat region for supporting the flat base portion of the top member and a pair of raised regions respectively having tilted ledges matching the two tilted arms of the wing-span portion of the top member.

15. The apparatus of claim 14 wherein each raised region is configured to protect an edge portion of the frameless solar module from potentially direct hitting the tilted arm of the wing-span portion of the top member.

16. The apparatus of claim 1 wherein the mounting configuration is associated with a mounting rail structure for direct supporting the common planar bottom of the bottom member along the second length direction and for fastening the hex cap bolt with the shaped nut set from below the mounting rail structure to fix the top member on top of the bottom member for clamping a longitudinal edge portion of the frameless solar module within the adjustable vertical offset distance.

17. A method for clamping frameless solar modules laminated with planar glass panels, the method comprises,
   providing a plurality of frameless solar modules, each frameless solar module being laminated with a planar substrate glass panel of a rectangle form factor bonded with a planar cover glass panel having the same form factor to hold a plurality of thin-film solar cells in between;
   laying a pair of mounting rail structures;
   providing a plurality of mounting clip assemblies, each mounting clip assembly comprising,
      a top member made by a single piece of solid material of a first length including a flat base portion with a first central hole and two wing-span portions out-extending from two opposite sides of the flat base portion respectively with two tilted arms connected to two contact sections, the single piece of solid material having a uniform cross-sectional shape throughout the first length such that the two contact sections are positioned from each other by a first width and in a same height above the flat base portion; and a bottom member made by a single piece of rubber material of a second length including a shaped middle section with a second central hole and two planar sections respectively out-extending with a common planar bottom from two opposite sides of the shaped middle section and ending with two upward rounded bumps, the shaped middle section being configured to seamlessly match a shape with the flat base portion and part of the tilted arms of the top member, the single piece of rubber material having a uniform cross-sectional shape throughout a second width;

placing the common planar bottom of one bottom member along the second length on a predetermined location on each of the pair of mounting rail structures;

disposing a first frameless solar module belonging to the plurality of frameless solar modules such that two first positions of the planar substrate glass panel off a first longitudinal edge of the first frameless solar module are supported by the two upward rounded bumps of first two bottom members respectively on the pair of mounting rail structures and two other first positions of the planar substrate glass panel off a second longitudinal edge of the first frameless solar module opposite to the first longitudinal edge are supported by two other upward rounded bumps of second two bottom members respectively on the pair of mounting rail structures;

placing one top member on top of each said bottom member with the corresponding first central hole being aligned with the corresponding second central hole to allow the flat base portion and part of tilted arms of the top member to fit in the shaped middle section of the bottom member;

coupling the first central hole and the second central hole such that two second positions of the planar cover glass panel next to the first longitudinal edge are contacted by two contact sections of first two top members associated with the first two bottom members and two other second positions of the planar cover glass panel next to the second longitudinal edge are contacted by two other contact sections of second two top members associated with the second two bottom members;

wherein each first position is vertically offset from the corresponding second position by a first distance based on a thickness from the planar cover glass panel to the planar substrate glass panel and horizontally offset from the same second position by a second distance predetermined for adequately supporting the first frameless solar module.

18. The method of claim 17 wherein the second distance is about 35 mm measured from a center of the upward round bump to a center of the contact section along a direction in parallel to the second length for adequate supporting the planar substrate glass panel of the first frameless solar module having the form factor of 1656 mm×656 mm.

19. The method of claim 17 wherein the first distance is measured from a recessed bottom surface of a contact pad attached to the contact section to a recessed top region of the upward rounded bump when clamping the first frameless solar module, both the contact pad and the bottom member including the upward rounded bump being made from a rubber material having a hardness of Durometer 50.

20. The method of claim 19 wherein each contact pad has a width of no greater than 13 mm so that the corresponding top member at the second position substantially causes no sun light blocking to active region of thin-film solar cells and said contact pad has a length substantially equal to the first length of the corresponding top member ranging from 180 mm to 200 mm for adequate clamping of the first frameless solar module having the form factor of 1656 mm×656 mm.

21. The method of claim 19 wherein each upward rounded bump comprises semi-cylindrical shape having a radius of about 13 mm and a length equal to the second length of the bottom member ranging from 45 mm to 65 mm for providing adequate recessed support to the first position of the planar substrate glass panel having the form factor of 1656 mm×656 mm that allows for uninhibited flexion of the first frameless solar module under static load.

22. The method of claim 17 wherein each second position is off a nearest transverse edge of the first frameless solar module by a distance ranging from 377 mm to 387 mm measured from center of the corresponding top member to the nearest transverse edge along a direction in parallel to the first longitudinal edge for adequate mounting the first frameless solar module having the form factor of 1656 mm×656 mm.

23. The method of claim 17 further comprising disposing at least a second frameless solar module belong to the plurality of frameless solar modules to allow a first longitudinal edge of the second frameless solar module being clamped by the two mounting clip assemblies used for clamping the second longitudinal edge of the first frameless solar module and to add two more mounting clip assemblies for clamping the second longitudinal edge of the second frameless solar module in corresponding mounting configuration on the same pair of mounting rail structure.

* * * * *